Nov. 10, 1931.    M. KAKIMOTO    1,831,306
HOSE GUIDE
Filed March 9, 1931

INVENTOR,
MORITATSU KAKIMOTO.
BY
ATTORNEY.

Patented Nov. 10, 1931

1,831,306

UNITED STATES PATENT OFFICE

MORITATSU KAKIMOTO, OF HALF MOON BAY, CALIFORNIA

HOSE GUIDE

Application filed March 9, 1931. Serial No. 521,279.

My invention relates to guides and protectors for water hose and the like.

Among the objects of my invention are: first, to provide a guide and support for a hose which will tend to prevent kinking of the hose and chafing or abrading its surface when moving it from place to place; second, to provide a guide which will enable the hose more readily to be pulled along when it is desired to move the hose; third, to provide a guide which may itself be easily and quickly moved and fixed in the new position; and fourth, to provide a guide which may be cheaply and simply constructed.

Other objects of my invention will be apparent or will be specifically pointed out in the description forming a part of this specification, but I do not limit myself to the embodiment of my invention herein described, as various forms may be adopted within the scope of the claims.

Referring to the drawings.

Figure 1:
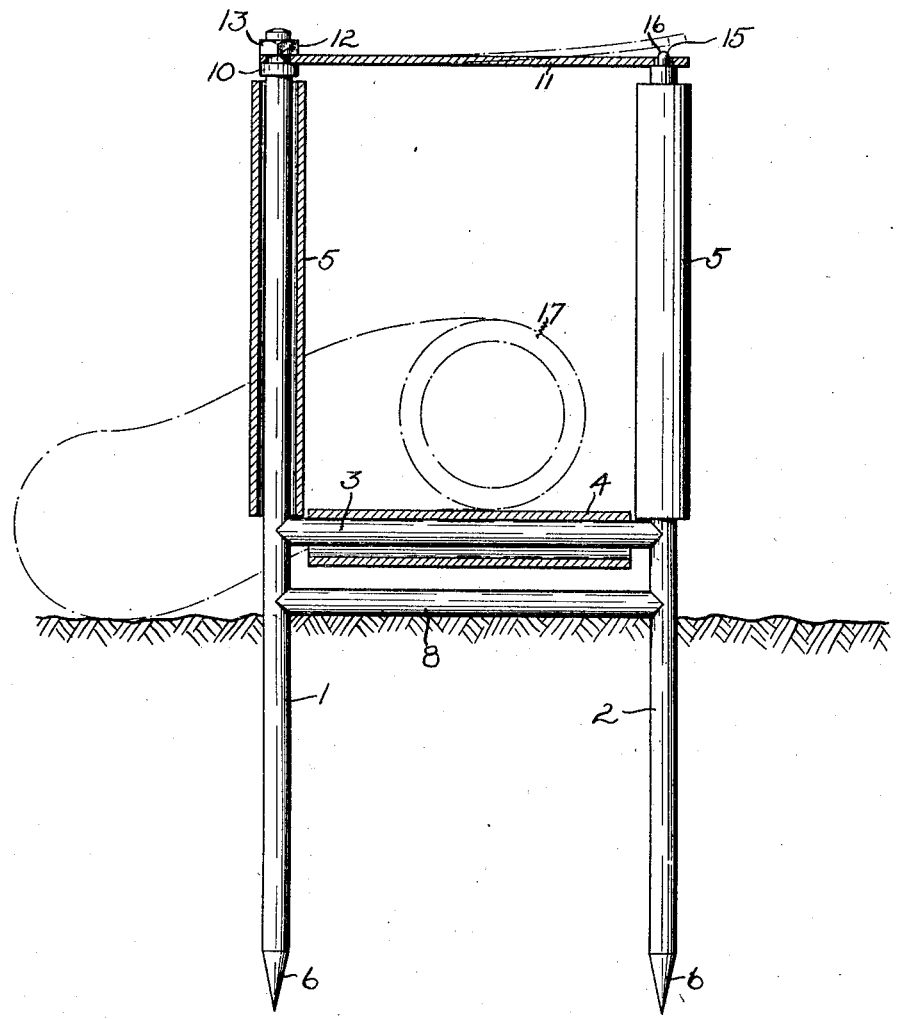
Figure 1 is a view, partly in elevation, and partly in section of a hose guide embodying my invention and fixed in position in the ground. The hose with which the guide is used is indicated in the drawing by dotted lines.
Figure 2:
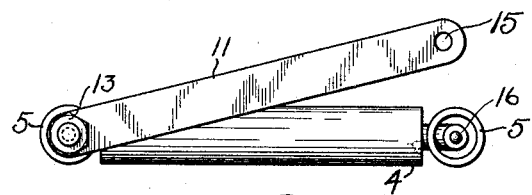
Figure 2 is a plan view of the hose guide of Figure 1.

The principal source of deterioration and wear in garden hose is the abrasion of the surface and the kinking of the hose which are occasioned by moving it from place to place. This is particularly severe where the hose is a long one, and where it must be pulled around interfering objects such as trees or bushes, or the corners of buildings, in order to reach the position where watering is to be done. Moreover, if the hose extends past delicate plants, there is considerable danger of damaging the plants when the hose is moved.

My invention comprises a frame or guide which is provided with rollers so that the hose may be pulled through it with negligible friction, and minimum danger of kinking. This frame may be fixed in position at any point where the hose must be carried around an angle, and will remain in this position until purposely moved. A suitable closure is provided which will retain the hose in position between the guide rollers, but which may readily be opened for the insertion or removal of the hose without the necessity of threading its entire length through the guide.

A preferred form of my invention comprises an H-shaped frame having vertical rods 1 and 2, joined by a cross-bar 3, which is welded or otherwise suitably secured between the vertical members. A roller 4, which may be a metal pipe or other tube, is rotatably mounted upon the cross-bar 3, and similar rollers 5, 5 turn on the rods 1 and 2 above the cross-bar.

The lower ends of the rods 1 and 2 are preferably provided with points 6, to facilitate the frame being thrust into the earth to secure it in position, and an additional cross-bar 8 may also be provided if desired to stiffen the frame and to prevent its being accidentally thrust down to such a depth as to prevent the movement of the roller 4.

The upper end of the rod 1 is provided with a flange 10. A strap 11, preferably of spring steel, has a hole 12 in one end which fits over the rod 1, and is retained in position by a fastening 13, which is preferably locked in place so as to secure the strap against vertical movement, while permitting it to be rotated around the rod 1. The other end of the strap is provided with an opening 15, which fits over a pin 16 mounted in the end of the rod 2.

The resiliency of the strap causes it to bear strongly against the top of the rod 2, but it may be sprung away to disengage the opening 15 from the pin, and permit the insertion of the hose 17, either with or without rotating the strap about the rod 1.

By grasping the strap 11 adjacent the rod 1, it may be used as a handle for removing the guide from one position and carrying it to another, without the necessity for removing the hose from the guide.

In general, it is advisable to thrust the guide less deeply in the earth than is shown in the drawings, in order that as great a length as possible of the hose may be supported free from the ground, and thus reduce the friction on its surface.

I claim:

1. In a hose guide, an H-shaped frame, the lower portion of said frame constituting a support for holding the frame in position and the upper portion constituting the guide portion, rollers mounted on the vertical and horizontal members forming the guide portion, and a movable closure extending between the upper ends of the frame to retain the hose in said guide portion.

2. In a hose guide, an H-shaped frame, the lower ends of said frame being provided with points to facilitate fixing the frame upright in the earth, rollers mounted on a horizontal member of said frame and on the vertical members of said frame above the horizontal member, and a movable closure extending between the upper ends of said vertical members to retain the hose between the rollers.

3. In a hose guide, an H-shaped frame, the lower portion of said frame constituting a support for holding the frame in position and the upper portion constituting the guide portion, rollers mounted on the vertical and horizontal members forming the guide portion, and a strip fixed against vertical movement to the top of one of said vertical members and bearing resiliently against the top of the other of said vertical members to retain the hose between said rollers, and capable of being sprung away from said second member to permit the insertion and removal of the hose.

4. In a hose guide, an H-shaped frame, the lower portion of said frame constituting a support for holding the frame in position and the upper portion constituting the guide portion, rollers mounted on the vertical and horizontal members forming the guide portion, and a strip fixed against vertical movement to the top of one of said vertical members and rotatably movable thereabout and bearing resiliently against the top of the other of said vertical members to retain the hose between said rollers, and capable of being sprung away from said second member to permit the insertion and removal of the hose.

In testimony whereof, I have hereunto set my hand.

MORITATSU KAKIMOTO.